(12) United States Patent
Stolan

(10) Patent No.: US 7,248,994 B1
(45) Date of Patent: Jul. 24, 2007

(54) DIGITAL METHOD AND APPARATUS FOR SENSING POSITION WITH A LINEAR VARIABLE DIFFERENTIAL TRANSFORMER

(75) Inventor: John A. Stolan, San Jose, CA (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 11/341,738

(22) Filed: Jan. 27, 2006

(51) Int. Cl.
*G01B 7/00* (2006.01)

(52) U.S. Cl. ............ 702/158; 324/207.11; 324/207.16; 324/207.17; 324/207.18; 702/150; 702/155; 702/189

(58) Field of Classification Search ........... 324/207.11, 324/207.16, 207.17, 207.18; 702/127, 150, 702/155, 158, 189
See application file for complete search history.

(56) References Cited

U.S. PATENT DOCUMENTS

| | | | |
|---|---|---|---|
| 3,005,969 A * | 10/1961 | Wysocki ...................... 336/134 |
| 3,041,874 A * | 7/1962 | Saxl ....................... 73/862.331 |
| 4,204,257 A | 5/1980 | Hungerford |
| 4,591,795 A * | 5/1986 | McCorkle .................... 327/104 |
| 4,599,560 A * | 7/1986 | Sanford et al. ......... 324/207.18 |
| 4,847,548 A * | 7/1989 | Lafler ......................... 323/264 |
| 5,241,268 A | 8/1993 | Lee |
| 5,327,030 A | 7/1994 | DeVito et al. |
| 5,717,331 A * | 2/1998 | Deller et al. ........... 324/207.18 |
| 5,912,638 A | 6/1999 | Vlahu |
| 6,084,376 A | 7/2000 | Piedl et al. |
| 6,163,127 A | 12/2000 | Patel et al. |
| 6,255,794 B1 | 7/2001 | Staebler |
| 6,320,349 B1 | 11/2001 | Kaneko et al. |
| 6,320,524 B1 | 11/2001 | Takehara |
| 6,323,790 B1 | 11/2001 | Takehara |
| 6,331,759 B1 | 12/2001 | Atmur |
| 6,505,141 B2 * | 1/2003 | Smith et al. ................. 702/166 |
| 6,690,159 B2 * | 2/2004 | Burreson et al. ....... 324/207.23 |
| 6,694,287 B2 | 2/2004 | Mir et al. |
| 6,754,610 B2 | 6/2004 | Dudler et al. |
| 6,844,720 B1 | 1/2005 | Pokrywka |
| 6,864,808 B2 * | 3/2005 | McBrien ....................... 341/20 |

(Continued)

FOREIGN PATENT DOCUMENTS

GB 2 339 287 A * 1/2000

(Continued)

*Primary Examiner*—Edward R Cosimano
(74) *Attorney, Agent, or Firm*—TraskBritt

(57) ABSTRACT

An apparatus and method for determining a linear position from a linear variable differential transformer (LVDT) including a primary coil driven by an excitation signal, and two secondary coils coupled to two correlated signals. The method includes converting the correlated signals to a digital estimate, for each of the correlated signals, and evaluating an amplitude of the correlated signals to determine the linear position. The process of converting the correlated signals comprises comparing the correlated signal to an analog feedback signal to generate a comparison result and incrementally adjusting the digital estimate in response to sampling the comparison result at an estimation frequency. The converting process also includes converting the digital estimate to the analog feedback signal, collecting a digital estimate history at a sample frequency that is a binary multiple of the excitation frequency, and analyzing the digital estimate history to determine the amplitude substantially near the excitation frequency.

32 Claims, 5 Drawing Sheets

U.S. PATENT DOCUMENTS

| | | |
|---|---|---|
| 6,931,918 B2 | 8/2005 | Herb |
| 7,015,840 B2 | 3/2006 | Takehara |
| 2002/0135386 A1* | 9/2002 | Smith et al. ................. 324/683 |
| 2003/0141917 A1* | 7/2003 | McBrien ..................... 327/304 |
| 2004/0056653 A1* | 3/2004 | Bocek et al. .......... 324/207.18 |
| 2005/0027405 A1 | 2/2005 | Stockbridge et al. |
| 2005/0035870 A1 | 2/2005 | Bauerle et al. |
| 2005/0046593 A1 | 3/2005 | Tulpule et al. |

FOREIGN PATENT DOCUMENTS

| | | |
|---|---|---|
| WO | WO 93/22622 A1 | 11/1993 |
| WO | WO 2004/004111 A1 | 1/2004 |
| WO | WO 2005/022087 A2 | 3/2005 |

* cited by examiner

DIGITAL METHOD AND APPARATUS FOR SENSING POSITION WITH A LINEAR VARIABLE DIFFERENTIAL TRANSFORMER

CROSS REFERENCE TO RELATED APPLICATIONS

The present application is related to concurrently filed U.S. patent application Ser. No. 11/341,706, entitled DIGITAL METHOD AND APPARATUS FOR RESOLVING SHAFT POSITION.

BACKGROUND OF THE INVENTION

1. Field of the Invention

This invention relates generally to determining linear position and, more particularly, to using digital means for determining linear position.

2. Description of Related Art

This invention relates to determining linear position by using the electrical outputs of a Linear Variable Differential Transformer (LVDT). It may be desirable to determine a linear position for many applications, for example, actuation systems on aircraft or rocket motors. One method of doing this is to use a LVDT to sense the position. The LVDT may use a sinusoidal excitation and measurement of two inductively coupled output signals. LVDTs have one primary winding and two secondary windings. The two secondary windings are mechanically arranged so an excitation signal on the primary winding will proportionally couple onto the secondary windings based on the position of a ferrous core. By measuring the voltages on the secondary windings it is possible to determine the linear position of the LVDT.

These output signals from the two secondary windings are generally analog signals, which may require a significant amount of analog electronics to evaluate the signal amplitudes and derive the shaft position. As a result, many proposals use analog-to-digital converters to convert the analog signals to digital signals, which may then be manipulated digitally to determine the respective amplitudes and calculate arithmetic functions to determine the shaft position. However, even these solutions may require complex analog-to-digital converters, and complex arithmetic engines for determining the signal amplitudes.

There is a need for a method and apparatus that reduces the complexity and number of analog components used in determining linear position by using simple analog components coupled to flexible digital logic and digital signal processing.

BRIEF SUMMARY OF THE INVENTION

The present invention reduces the complexity and number of analog devices needed to resolve linear position.

An embodiment of the present invention comprises an apparatus for determining a linear position of a LVDT. The apparatus includes a first signal analyzer, a second signal analyzer, and a result calculator. The LVDT includes an excitation input coupled to an excitation signal with an excitation frequency, a first positional output coupled to an analog input of the first signal analyzer, and a second positional output coupled to an analog input of the second signal analyzer. Each of the first signal analyzer and the second signal analyzer includes a comparator, a digital estimator, a digital-to-analog converter, and an amplitude analyzer. The comparator is configured for comparing the analog input to an analog feedback signal and generating a comparison result. The digital estimator uses the comparison result to modify a digital estimate by an incremental adjustment amount at an estimation frequency in response to the comparison result. The digital estimate is converted to the analog feedback signal by the digital-to-analog converter. The amplitude analyzer collects a digital estimate history at a sample frequency that is a binary multiple of the excitation frequency and determines an amplitude of the digital estimate substantially near the excitation frequency. With the amplitudes determined, the result calculator evaluates the amplitude for each of the first signal analyzer and second signal analyzer to generate the linear position.

Another embodiment of the present invention comprises a method for determining a linear position. The method comprises resolving an excitation signal at an excitation frequency into at least two correlated signals, converting the at least two correlated signals to a digital estimate for each of the correlated signals, and evaluating an amplitude of the digital estimate of the correlated signals to determine the linear position. The process of converting the correlated signals comprises comparing the correlated signal to an analog feedback signal to generate a comparison result and incrementally adjusting the digital estimate in response to sampling the comparison result at an estimation frequency. The converting process also includes converting the digital estimate to the analog feedback signal, collecting a digital estimate history at a sample frequency that is a binary multiple of the excitation frequency, and analyzing the digital estimate history to determine the amplitude of the digital estimate substantially near the excitation frequency.

Yet another embodiment in accordance with the present invention comprises a method of determining a linear position. This method includes resolving an excitation signal at an excitation frequency into a first signal and a second signal, converting the first signal to a first digital estimate, converting the second signal to a second digital estimate, evaluating a first amplitude and a second amplitude to determine the linear position. Converting the first signal includes comparing the first signal to a first analog feedback signal to generate a first comparison result. Converting the first signal also includes incrementally adjusting the first digital estimate in response to sampling the first comparison result at an estimation frequency, converting the first digital estimate to the first analog feedback signal, and analyzing the first digital estimate to determine the first amplitude of the first signal substantially near the excitation frequency. Similarly, converting the second signal includes comparing the second signal to a second analog feedback signal to generate a second comparison result. Converting the second signal also includes incrementally adjusting the second digital estimate in response to sampling the second comparison result at the estimation frequency, converting the second digital estimate to the second analog feedback signal, and analyzing the second digital estimate to determine the second amplitude of the second signal substantially near the excitation frequency.

BRIEF DESCRIPTION OF THE DRAWINGS

In the drawings, which illustrate what is currently considered to be the best mode for carrying out the invention.

DETAILED DESCRIPTION OF THE INVENTION

The present invention reduces the complexity and number of analog devices needed to resolve linear position obtained from a linear variable differential transformer (LVDT).

In the following description, circuits and functions may be shown in block diagram form in order not to obscure the present invention in unnecessary detail. Conversely, specific circuit implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal. Furthermore, signals may be referred to as asserted and negated. Those of ordinary skill in the art will recognize that in most instances, the selection of asserted or negated may be arbitrary and the invention could be implemented with the opposite states for such signals.

Figure 1:
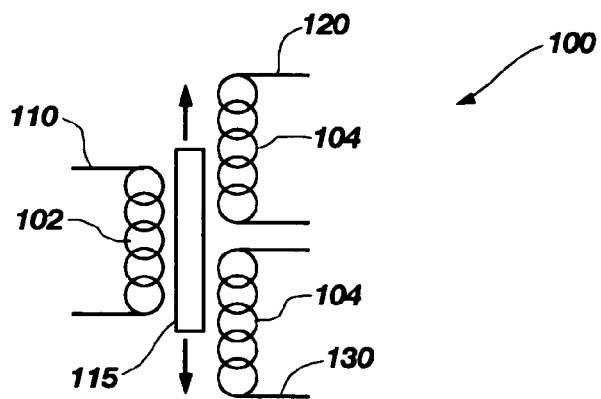
FIG. 1 is a schematic depiction of a linear variable differential transformer (LVDT)

FIG. 1 illustrates a LVDT 100. The LVDT 100 includes an excitation input 110 attached to a primary coil 102 and at least two secondary coils 104 attached to modulation outputs (120 and 130). The LVDT also includes a ferrous core 115, which moves linearly relative to the primary coil 102 and secondary coils 104. Generally, the core may be attached to a linkage or other means for mechanical linking (not shown) to external parts (not shown). The primary coil 102 and secondary coils 104 include windings positioned such that when an electrical signal is induced in the primary coil 102 inductive coupling produces electrical signals in the secondary coils 104 windings. The secondary coils 104 may be positioned such that, the amount of inductive coupling to each secondary coil 104 may be different and dependent on the position of the core 115. Thus, by measuring the voltages on the secondary coils 104 it is possible to determine the linear position of the core 115 and, as a result, the linear position of a linkage attached thereto. Throughout this description, the modulation outputs (120 and 130) may also be referred to as correlated signals (120 and 130) or as a first positional output 120 and a second positional output 130.

Figure 2A:
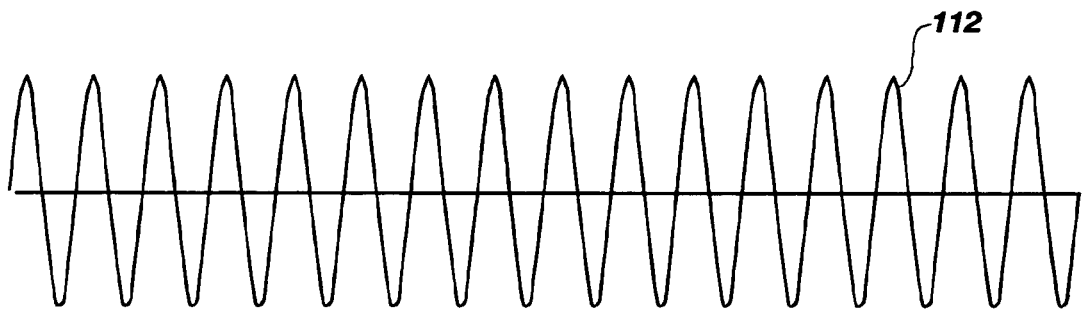
FIG. 2A illustrates a representative excitation waveform for input to a LVDT.
Figure 2B:
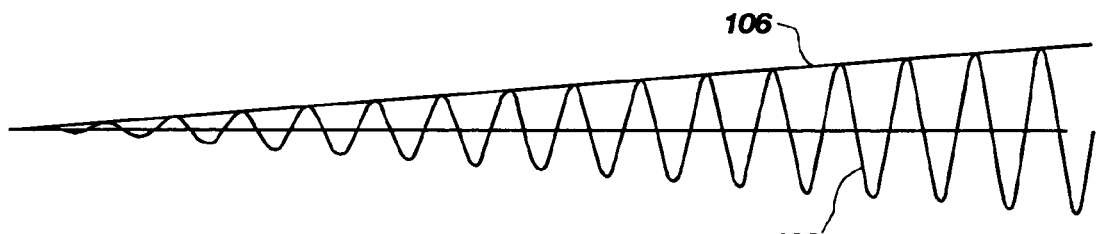
FIG. 2B illustrates a representative first positional output waveform from a LVDT when the excitation input is the excitation waveform of FIG. 2A and the core of the LVDT is moving at a constant rate.
Figure 2C:
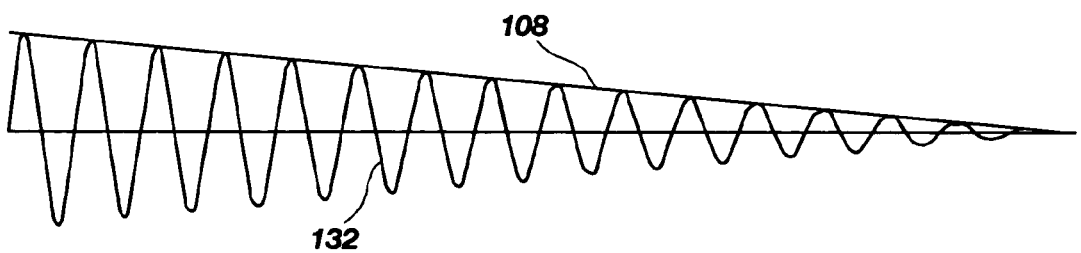
FIG. 2C illustrates a representative second positional output waveform from a LVDT when the excitation input is the excitation waveform of FIG. 2A and the core of the LVDT is moving at a constant rate.

By way of example, FIG. 2A illustrates an excitation signal 112 that may be applied to the excitation input 110 coupled to the primary coil 102. In this example, the excitation signal 112 is a sinusoidal signal driven through the primary coil 102, which inductively induces modulated signals in the correlated outputs (120 and 130). FIGS. 2B and 2C illustrate the modulation outputs that may be present when the primary coil 102 is moving at a substantially constant rate from one extreme to the other. A first signal 122 on the first positional output 120 includes a modulated amplitude that is modulated along an increasing envelope 106 having a substantially linear rate corresponding to the movement of the core 115. Similarly, a second signal 132 on the second positional output 130 includes a modulated amplitude that is modulated along a decreasing envelope 108 having a substantially linear rate corresponding to the movement of the core 115. FIGS. 2A, 2B, and 2C are simple examples illustrating general operation with a simple constant linear movement. Those of ordinary skill in the art will recognize that the envelopes (106 and 108) representing movement of the core 115 may be complex, and perhaps vibratory waveforms. As a result, the excitation frequency should be substantially higher than an expected rate of change of the core 115 displacement. For example, the excitation signal 112 may have an excitation frequency generally in the range of about 1 to 10 kHz, but the scope of the invention is not limited to this range.

Figure 3:
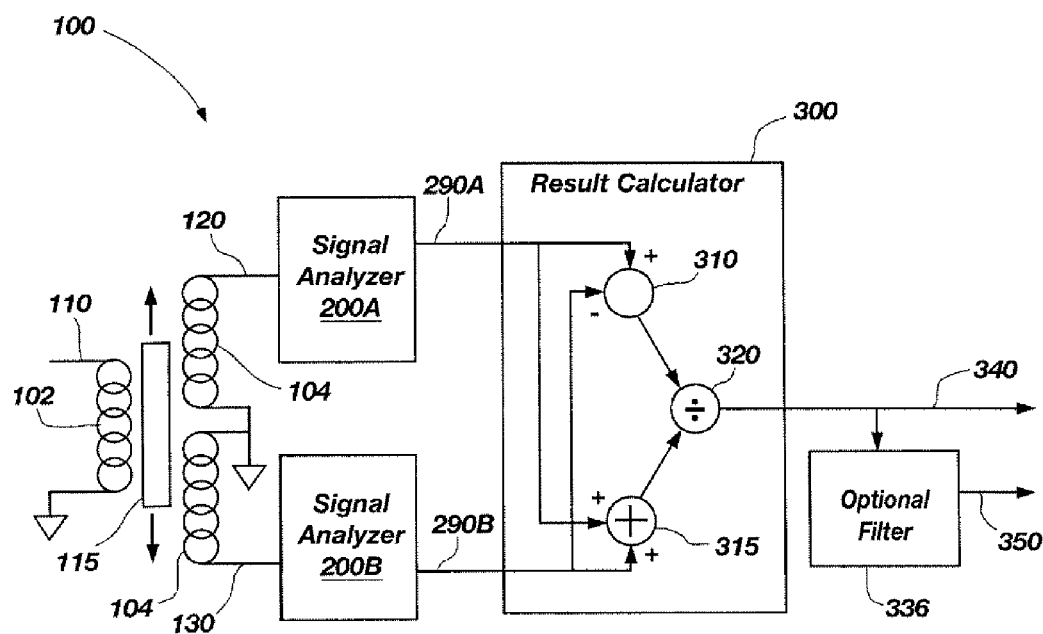
FIG. 3 is a schematic depiction of a representative embodiment of the present invention including a LVDT.

FIG. 3 illustrates a representative embodiment of the present invention. The excitation input 110 couples to the primary coil 102 of the LVDT 100. The secondary coils 104 of the LVDT 100 are coupled to a first positional output 120 and a second positional output 130. Each of the first positional output 120 and the second positional output 130 are coupled to a signal analyzer (200A and 200B). Each signal analyzer (200A and 200B) generates an amplitude (290A and 290B) for its respective input signal.

A result calculator 300 receives the outputs from the signal analyzers (200A and 200B) to calculate the linear position 340. The position of the core 115 may be determined by the difference between the two secondary windings divided by their sum. Thus, the result calculator 300 may comprise an arithmetic unit configured for calculating the equation $(A-B)/(A+B)$ wherein A represents the amplitude 290A from the first signal analyzer 200A, B represents the amplitude 290B from the second signal analyzer 200B, and the calculation result represents the linear position 340.

The result calculator also may comprise dedicated circuitry for calculating the linear position as illustrated in FIG.

3. In FIG. 3, a subtractor 310 subtracts the second amplitude 290B from the first amplitude 290A. Similarly, an adder 315 adds the first amplitude 290A and second amplitude 290B. A divider 320 divides the result from the subtractor 310 by the result from the adder 315 to determine the linear position 340. The final result is a digital representation of the linear position 340. An optional filter 336 may be used to filter the linear position 340 with a conventional digital filtering algorithm to further reduce noise and generate a filtered linear position 350.

Figure 4:
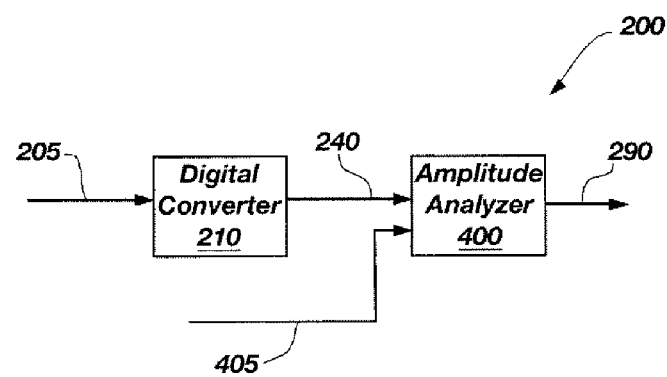
FIG. 4 is a schematic depiction of a representative embodiment of a signal analyzer according to the present invention.

FIG. 4 illustrates a representative embodiment of the signal analyzer 200. The signal analyzer 200 is the same for both the first signal analyzer 200A and the second signal analyzer 200B. Thus, the first positional output 120 and the second positional output 130 couple to the input signal 205 of their respective signal analyzers (200A and 200B). Similarly, the amplitude 290 output from the signal analyzer 200 couples to the corresponding amplitude output of the first signal analyzer 200A and the second signal analyzer 200B.

In the signal analyzer 200, the input signal 205 couples to a digital converter 210, which converts the analog input signal to a digital estimate 240. The digital estimate 240 is used by an amplitude analyzer 400 to generate the amplitude of the input signal 205.

The amplitude analyzer 400 repeatedly samples the digital estimate 240 using the sample clock 405 to create a digital estimate history, which may be used to convert the time varying digital estimate 240 from the time domain to the frequency domain. The output of the amplitude analyzer 400 is a digital signal indicating the amplitude 290 of the modulated signal substantially near the excitation frequency. In other words, the output of the first amplitude analyzer is a digital value indicating the amplitude 290A of the first positional output 120 substantially near the excitation frequency and the output of the second amplitude analyzer is a digital value indicating the amplitude 290B of the second positional output 130 substantially near the excitation frequency. The amplitude analyzer 400 is explained more fully below.

A digital converter 210 is used to provide a continuously available estimate of the input signal 205 accurate to within one bit. A continuously available estimate may be advantageous in that it does not have the sample and hold characteristics of many conventional analog-to-digital converters and may not need to be synchronized to other clocks within the system.

Figure 5:
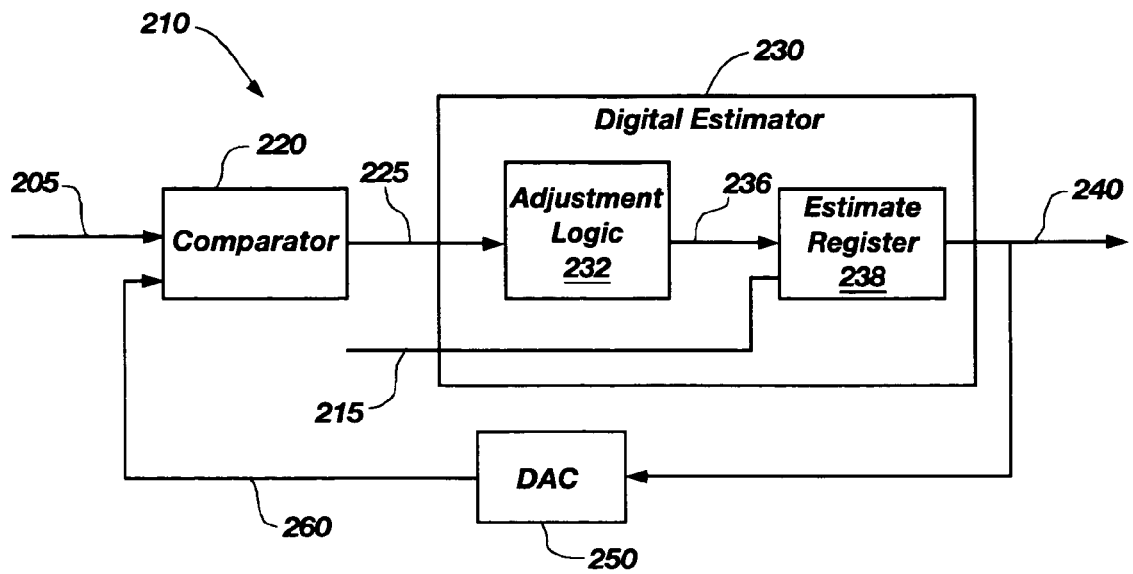
FIG. 5 is a schematic depiction of a representative embodiment of a digital converter according to the present invention.

Details of a representative embodiment of the digital converter 210 are illustrated in FIG. 5. In the digital converter 210, the input signal 205 couples to a simple fast analog comparator 220. The other input of the analog comparator 220 is coupled to an analog feedback signal 260. The comparison result 225 is a digital signal that may be asserted if the input signal 205 is larger than the analog feedback signal 260 and negated if the input signal 205 is smaller than the analog feedback signal 260.

A digital estimator 230, which is controlled by an estimation clock 215, analyzes the comparison result 225 to update the digital estimate 240. The update rate at which the estimation clock 215 runs is selected such that the estimate will always be able to track the input signal 205. Thus, the estimation frequency may be a substantially higher frequency than the excitation frequency. For example, and not limitation, the estimation clock 215 may run at or above one MHz for an excitation frequency of about 10 kHz.

The digital converter 210 is a feedback loop that begins by selecting a starting digital estimate 240 of the signal amplitude, which is stored in an estimate register 238. The comparison result 225 is used by adjustment logic 232 to determine whether the digital estimate 240 should be improved by modifying the digital estimate 240 by an incremental adjustment amount. Thus, based on the comparison result 225, the adjustment logic 232 may generate an adjustment signal 236 for incrementing, decrementing, or maintaining the digital estimate 240. The resulting new digital estimate couples to a digital-to-analog converter 250, which generates the analog feedback signal 260 for comparison in the comparator 220. The feedback loop continues until the digital estimate 240 is an accurate representation of the input signal 205. Then, as the input signal 205 changes, the digital converter 210 can easily track the changes through the adjustment logic 232 and feedback loop.

For many applications, this method may be unacceptably slow. However, embodiments of the present invention take advantage of the A Priori knowledge that the input signal will be substantially a sinusoidal wave of known frequency and limited, but varying, amplitude. The update rate (i.e., the estimation frequency) is selected such that the estimate will always be able to accurately track the input signal. As a result, this method is faster than other conversion methods, provides an estimate accurate to within one bit, and provides an estimate that is continuously available to other circuitry in the system.

Figure 6:
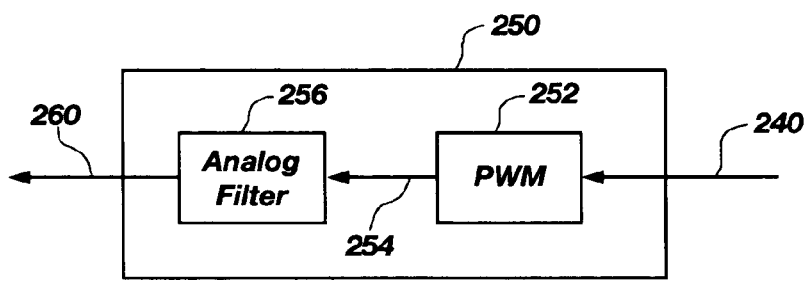
FIG. 6 is a schematic depiction of a representative embodiment of a digital-to-analog converter according to the present invention.

The digital-to-analog converter 250 may be implemented in a variety of ways known to those of ordinary skill in the art. One representative embodiment of the digital-to-analog converter 250 that may be simple to implement is illustrated in FIG. 6. The digital estimate 240 is used by a pulse-width modulator 252 (PWM), which converts the digital estimate 240 into a pulse-width modulated estimate 254, which is a series of pulses with varying duty cycles corresponding to the digital estimate values. An analog filter 256 filters the pulse-width modulated estimate 254 to generate the analog feedback signal 260 to represent variations in the digital estimate 240.

Figure 7A:
FIG. 7A illustrates a representative pulse width modulation signal for generating a sine wave.

FIG. 7A illustrates an example pulse-width modulated estimate 254. The width of the pulses (i.e., the duty cycle) is varied in proportion to the magnitude of the digital estimate to generate the pulse train with varying pulse widths. As a result, the pulse-width modulated estimate 254 includes a varying amount of energy, which corresponds to the high portion of the pulses. Therefore, the pulse-width modulated estimate 254 may be filtered by a simple low pass analog filter 256 to generate the analog feedback signal 260 (shown as signal plot 285 in FIG. 7B).

Figure 8:
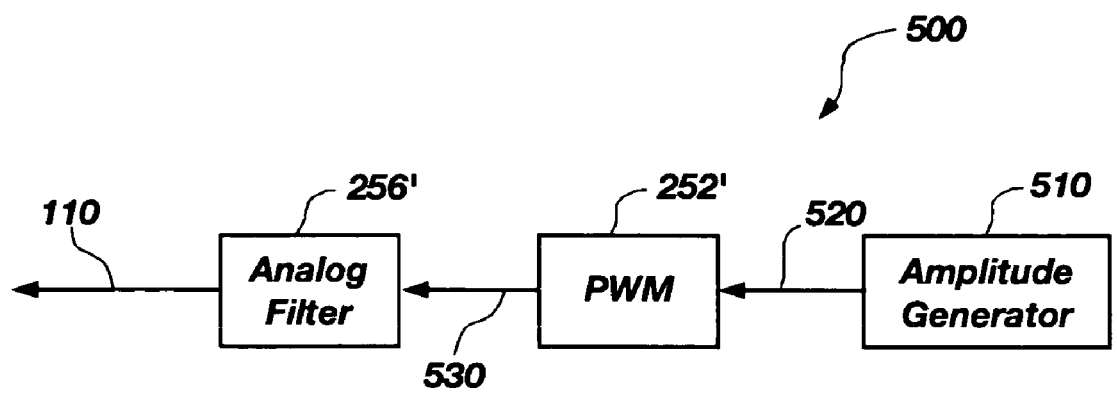
FIG. 8 is a schematic depiction of a representative embodiment of an excitation signal generator according to the present invention.

Returning to FIG. 3, the excitation input 110 may be configured as a sine wave with an excitation frequency. A simple excitation generator 500 may be used for generating the excitation input 110, as illustrated in FIG. 8. An amplitude generator 510 creates a digital excitation signal 520 with values that vary at a generation frequency. The digital excitation signal 520 is used by a PWM 252', which converts the digital excitation signal 520 into a pulse-width modulated signal 530. An analog filter 256' filters the pulse-width modulated signal 530 to generate the excitation input 110.

Figure 7B:
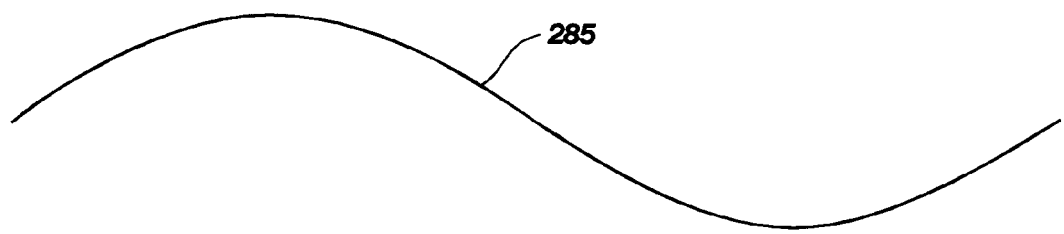
FIG. 7B illustrates a sine wave that may be produced by low pass filtering the pulse width modulation signal of FIG. 7A.

The function of the amplitude generator 510 including the pulse-width modulator 252' and analog filter 256' is similar to what was described for the digital-to-analog converter 250 of FIGS. 6, 7A and 7B. However, for the excitation generator 500 the amplitude generator 510 creates the desired signal. Thus, in FIG. 8 the amplitude generator 510 creates a digital excitation signal 520, which is a time varying digital representation for emulating a sine wave. The amplitude generator 510 may be some type of arithmetic unit for calculating sine waves, or it may be a simple look-up table with the proper amplitudes for generating a sine wave.

Returning to FIG. 4, the amplitude analyzer 400 converts the time varying digital estimate 240 from the time domain to the frequency domain. Generally, converting a time domain signal to the frequency domain generates a function with amplitudes at a variety of frequencies. The output of the amplitude analyzer 400 is a digital signal indicating the amplitude 290 of the modulated signal substantially near the excitation frequency. A number of implementations for finding the amplitude 290 of the modulated signal substantially near the excitation frequency may be used, such as, for example, implementing a conventional Fast Fourier Transform (FFT). However, a simpler implementation may be used for the present invention because only the amplitude 290 at the excitation frequency is needed.

Figure 9:
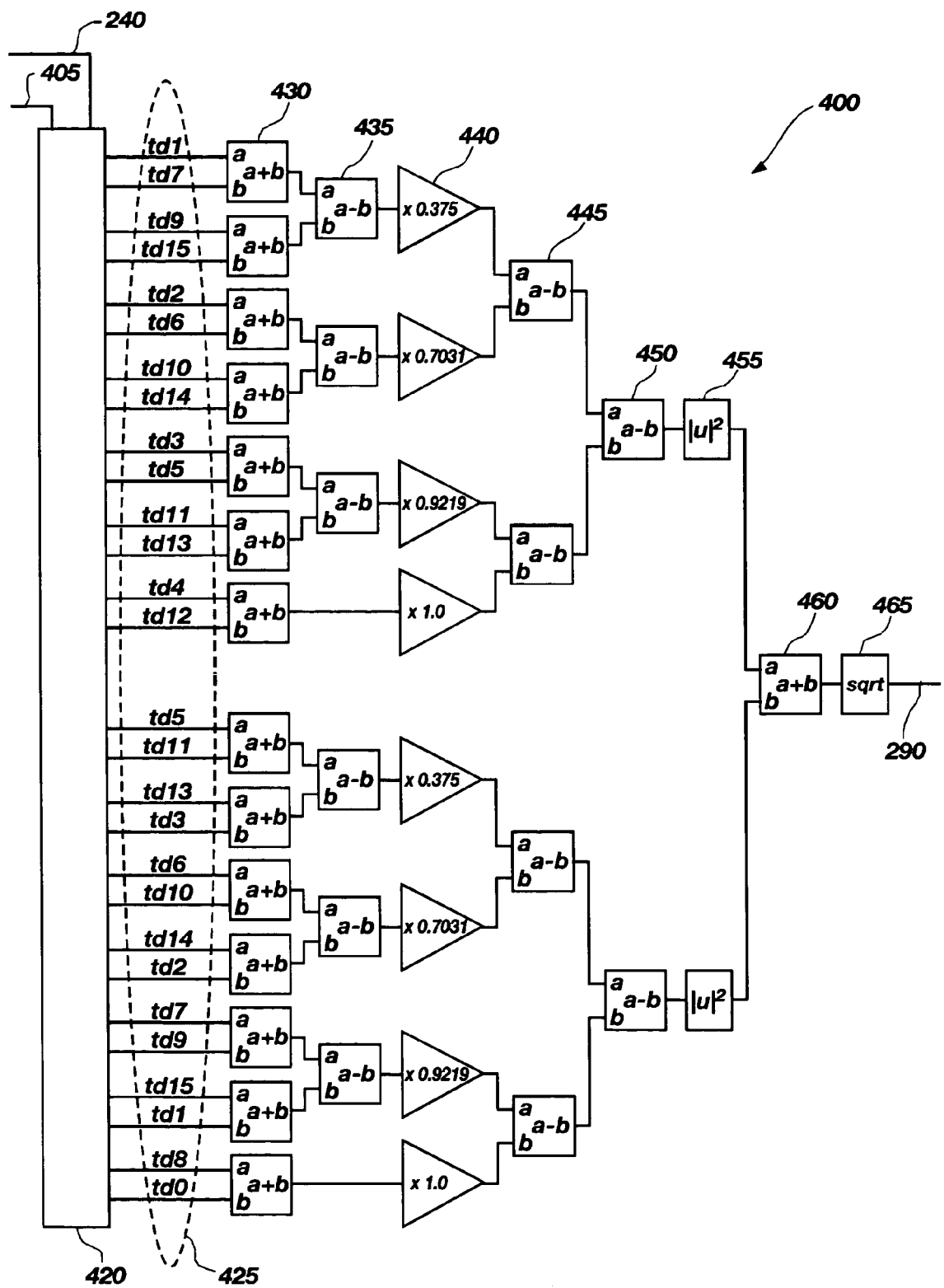
FIG. 9 is a schematic depiction of a representative embodiment of an amplitude analyzer according to the present invention.

FIG. 9 illustrates an implementation of an amplitude analyzer 400. A sample clock 405 running at a sample frequency feeds a history shift register 420 configured to sample and shift values of the digital estimate 240. Thus, the history shift register 420 generates a digital estimate history (425) N bits long.

The digital estimate history 425 is coupled to a set of summing units 430 in a butterfly pattern recognizable to those of ordinary skill in the art in performing a Discrete Fourier Transform (DFT), except that only the calculations necessary to determine the amplitude at the excitation frequency are performed. A first set of difference units 435 perform subtractions on the results from the first set of summing units. A set of multipliers 440 multiply the subtraction results from the first set of difference units by the appropriate constants for a DFT. A second set of difference units 445 perform subtractions on the results from the multipliers 440. A third set of difference units 450 perform subtractions on the results from the second set of difference units 445. A set of squaring units 455 square the absolute value of the results from the third set of difference units 450. A summing unit 460 adds the results from the set of squaring units 455, and a square root unit 465 calculates the square root of the result from the summing unit 460 to arrive at the final amplitude 290.

The number of bits N in the digital estimate history 425 may be chosen to be a binary multiple. In the example of FIG. 9, the number of bits is chosen as 16 to generate the digital estimate history 425 of signals td0-td15. In addition, the sample frequency of the sample clock 405 is chosen to correspond to the number of bits such that the sample frequency is a binary multiple of the excitation frequency. Thus, in the example of FIG. 9, the sample frequency is set at 16 times the excitation frequency such that digital estimate history 425 comprises samples of one full cycle of the excitation frequency.

In operation, the implementation of FIG. 9 performs a limited DFT in that it only calculates the amplitude at the excitation frequency. For each sample point, the limited DFT is taken to provide the instantaneous amplitude of the input signal at the base excitation frequency. As each sample is taken, the new value is operated on along with the previous 15 samples using the limited DFT.

Those of ordinary skill in the art will recognize that embodiments of the amplitude analyzer 400 may encompass other bit widths and sample rates for the limited DFT. For example, the limited DFT may use a sample frequency that is of $2^N$ times the sample frequency wherein N may be in a range from 2 to 10. In addition, as stated earlier, the amplitude analyzer 400 also encompasses implementations that perform a full DFT or FFT to determine the amplitude of the digital estimate at the excitation frequency.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. An apparatus for determining a linear position of a movable component of a linear variable differential transformer (LVDT), which includes a primary coil driven by an excitation signal at an excitation frequency, a first positional output, and a second positional output, the apparatus comprising:
a first signal analyzer including an analog input operably coupled to the first positional output and a second signal analyzer including an analog input operably coupled to the second positional output, each of the first signal analyzer and the second signal analyzer comprising:
a feedback loop configured to generate a digital estimate that substantially tracks an amplitude of the analog input, the feedback loop comprising:
a comparator configured for comparing the analog input to an analog feedback signal and generating a comparison result;
a digital estimator, operating at an estimation frequency and configured to sample the comparison result and modify the digital estimate by an incremental adjustment amount responsive to the comparison result to reduce a difference between the amplitude of the analog input signal and an amplitude of the analog feedback signal; and
a digital-to-analog converter configured to convert the digital estimate to the analog feedback signal; and
an amplitude analyzer configured to collect a digital estimate history by sampling the digital estimate at a sample frequency that is a binary multiple of the excitation frequency and analyze the digital estimate history to determine an amplitude of the digital estimate substantially near the excitation frequency; and
a result calculator configured to evaluate the amplitude of the digital estimate from the first signal analyzer and the amplitude of the digital estimate from the second signal analyzer to generate a numerical representation of the linear position of the movable component.

2. The apparatus of claim 1, further comprising a digital filter configured for filtering the linear position to generate a filtered linear position.

3. The apparatus of claim 1, wherein the result calculator comprises an arithmetic unit configured for calculating the equation (A−B)/(A+B) wherein A represents the amplitude of the first signal analyzer, B represents the amplitude of the second signal analyzer, and the calculation result represents the linear position.

4. The apparatus of claim 1, wherein the result calculator comprises:
a first adder configured for adding the amplitude of the first signal analyzer to the amplitude of the second signal analyzer to generate a first term;
a second adder configured for subtracting the amplitude of the second signal analyzer from the amplitude of the first signal analyzer to generate a second term; and a divider configured for dividing the second term by the first term to generate the linear position.

5. The apparatus of claim 1, wherein the digital-to-analog converter comprises:
   a pulse-width modulator configured for converting the digital estimate to a digital pulse with a duty cycle correlated to the digital estimate to generate a pulse-width modulated estimate; and
   a low pass filter configured for filtering the pulse-width modulated estimate to generate the analog feedback signal.

6. The apparatus of claim 1, wherein the incremental adjustment amount is selected from the group consisting of no change, a positive increment, and a negative increment.

7. The apparatus of claim 1, wherein the binary multiple for the sample frequency is at a frequency of $2^N$ times the sample frequency wherein N is in a range from 2 to 10.

8. The apparatus of claim 1, wherein the amplitude analyzer further comprises a frequency analyzer configured to determine the amplitude of the digital estimate substantially near the excitation frequency by performing an operation selected from the group consisting of a fast Fourier transform, a discrete Fourier transform, and a limited discrete Fourier transform.

9. The apparatus of claim 1, further comprising an excitation generator configured for generating the excitation signal as substantially a sine wave at the excitation frequency.

10. The apparatus of claim 9, wherein the excitation generator comprises:
    an amplitude generator configured for generating a digital representation of the excitation signal at each time period of a generation frequency;
    a pulse-width modulator configured for converting the digital representation to a digital pulse with a duty cycle correlated to the digital representation to generate a pulse-width modulated signal; and
    a low pass filter configured for filtering the pulse-width modulated signal to generate the excitation signal.

11. The apparatus of claim 10, wherein the amplitude generator is selected from the group consisting of a look-up table and a trigonometric calculator.

12. A method for determining a linear position, comprising:
    generating at least two correlated signals from a Linear Variable Differential Transformer (LVDT) by stimulating an excitation input with an excitation signal, wherein the at least two correlated signals are responsive to a linear position of a movable component of the LVDT and the excitation signal;
    converting the at least two correlated signals to a digital estimate for each of the at least two correlated signals, the converting comprising:
       comparing the correlated signal to an analog feedback signal to generate a comparison result;
       incrementally adjusting the digital estimate at an estimation frequency in response to sampling the comparison result such that the incremental adjusting reduces a difference between the correlated signal and the analog feedback signal;
       converting the digital estimate to the analog feedback signal;
       collecting a digital estimate history by sampling the digital estimate at a sample frequency that is a binary multiple of an excitation frequency of the excitation signal; and
    analyzing the digital estimate history to determine an amplitude of the digital estimate substantially near the excitation frequency; and
    evaluating the amplitude of the digital estimate substantially near the excitation frequency of the at least two correlated signals to determine a numerical representation of the linear position of the movable component.

13. The method of claim 12, further comprising digitally filtering the linear position to generate a filtered linear position.

14. The method of claim 12, wherein evaluating the amplitude of the digital estimate of the at least two correlated signals comprises calculating the equation $(A-B)/(A+B)$ wherein A represents the amplitude of a first of the at least two correlated signals, B represents the amplitude of a second of the at least two correlated signals, and the calculation result represents the linear position.

15. The method of claim 12, wherein converting the digital estimate to the analog feedback signal comprises:
    converting the digital estimate to a digital pulse with a duty cycle correlated to the digital estimate to generate a pulse-width modulated estimate; and
    filtering the pulse-width modulated estimate to generate the analog feedback signal.

16. The method of claim 12, wherein incrementally adjusting the digital estimate is a process selected from the group consisting of no change, a positive increment, and a negative increment.

17. The method of claim 12, wherein the binary multiple for the sample frequency is at a frequency of $2^N$ times the sample frequency wherein N is in a range from 2 to 10.

18. The method of claim 12, wherein analyzing the digital estimate history comprises performing an operation selected from the group consisting of a fast Fourier transform, a discrete Fourier transform, and a limited discrete Fourier transform.

19. The method of claim 12, further comprising generating the excitation signal as substantially a sine wave at the excitation frequency.

20. The method of claim 19, wherein generating the excitation signal comprises:
    generating a digital representation of the excitation signal at each time period of a generation frequency;
    converting the digital representation to a digital pulse with a duty cycle correlated to the digital representation to generate a pulse-width modulated signal; and
    filtering the pulse-width modulated signal to generate the excitation signal.

21. The method of claim 20, wherein generating the digital representation is a process selected from the group consisting of calculating the digital representation and retrieving the digital representation from a look-up table.

22. A method for determining a linear position of a movable component of a linear variable differential transformer (LVDT), which includes a primary coil driven by an excitation signal at an excitation frequency, a first signal from a first secondary coil, and a second signal from a second secondary coil, comprising:
    converting the first signal to a first digital estimate, the converting comprising:
       comparing the first signal to a first analog feedback signal to generate a first comparison result;
       incrementally adjusting the first digital estimate at an estimation frequency in response to sampling the first comparison result to reduce a difference between an amplitude of the first signal and an amplitude of the first analog feedback signal;

converting the first digital estimate to the first analog feedback signal;
sampling the first digital estimate at the sample frequency to generate a first digital estimate history; and
analyzing the first digital estimate history to determine a first amplitude of the first signal substantially near the excitation frequency;
converting the second signal to a second digital estimate, the converting comprising:
comparing the second signal to a second analog feedback signal to generate a second comparison result;
incrementally adjusting the second digital estimate at an estimation frequency in response to sampling the second comparison result to reduce a difference between an amplitude of the second signal and an amplitude of the second analog feedback signal;
converting the second digital estimate to the second analog feedback signal;
sampling the second digital estimate at a sample frequency to generate a second digital estimate history; and
analyzing the second digital estimate history to determine a second amplitude of the second signal substantially near the excitation frequency; and
evaluating the first amplitude and the second amplitude to determine a numerical representation of the linear position of the movable component.

23. The method of claim 22, further comprising digitally filtering the linear position to generate a filtered linear position.

24. The method of claim 22, wherein evaluating the first amplitude and the second amplitude comprises:
adding the first amplitude to the second amplitude to generate a first term;
subtracting the second amplitude from the first amplitude to generate a second term;
dividing the second term by the first term to generate the linear position.

25. The method of claim 22, wherein converting the digital estimate to the analog feedback signal comprises:
converting the digital estimate to a digital pulse with a duty cycle correlated to the digital estimate to generate a pulse-width modulated estimate; and
filtering the pulse-width modulated estimate to generate the analog feedback signal.

26. The method of claim 22, wherein incrementally adjusting the first digital estimate and incrementally adjusting the second digital estimate are processes selected from the group consisting of no change, a positive increment, and a negative increment.

27. The method of claim 22, wherein analyzing the first digital estimate and analyzing the second digital estimate each comprises performing an operation selected from the group consisting of a fast Fourier transform, a discrete Fourier transform, and a limited discrete Fourier transform.

28. The method of claim 22, wherein:
analyzing the first digital estimate comprises:
collecting a first digital estimate history at a sample frequency that is a binary multiple of the excitation frequency of the excitation signal; and
analyzing the first digital estimate history to determine the first amplitude; and
analyzing the second digital estimate comprises:
collecting a second digital estimate history at the sample frequency that is the binary multiple of the excitation frequency of the excitation signal; and
analyzing the second digital estimate history to determine the second amplitude.

29. The method of claim 28, wherein the binary multiple for the sample frequency is at a frequency of $2^N$ times the sample frequency wherein N is in a range from 2 to 10.

30. The method of claim 22, further comprising generating the excitation signal as substantially a sine wave at the excitation frequency.

31. The method of claim 30, wherein generating the excitation signal comprises:
generating a digital representation of the excitation signal at each time period of a generation frequency;
converting the digital representation to a digital pulse with a duty cycle correlated to the digital representation to generate a pulse-width modulated signal; and
filtering the pulse-width modulated signal to generate the excitation signal.

32. The method of claim 31, wherein generating the digital representation is a process selected from the group consisting of calculating the digital representation and retrieving the digital representation from a look-up table.

* * * * *